United States Patent
Miyazawa et al.

(10) Patent No.: US 11,154,987 B2
(45) Date of Patent: Oct. 26, 2021

(54) ROBOT

(71) Applicant: Seiko Epson Corporation, Tokyo (JP)

(72) Inventors: Yasunaga Miyazawa, Okaya (JP); Mitsuhiro Yamamura, Suwa (JP); Hideaki Oka, Minowa (JP); Toshiyuki Kamiya, Fujimi (JP); Hajime Kobayashi, Chino (JP)

(73) Assignee: Seiko Epson Corporation

( * ) Notice: Subject to any disclaimer, the term of this patent is extended or adjusted under 35 U.S.C. 154(b) by 441 days.

(21) Appl. No.: 16/190,621

(22) Filed: Nov. 14, 2018

(65) Prior Publication Data

US 2019/0143522 A1  May 16, 2019

(30) Foreign Application Priority Data

Nov. 15, 2017  (JP) .............................. JP2017-219719

(51) Int. Cl.
| | |
|---|---|
| B25J 9/16 | (2006.01) |
| B25J 13/08 | (2006.01) |
| G01V 13/00 | (2006.01) |
| B25J 19/06 | (2006.01) |
| G01V 3/08 | (2006.01) |

(52) U.S. Cl.
CPC ........... *B25J 9/1676* (2013.01); *B25J 13/086* (2013.01); *B25J 19/06* (2013.01); *G01V 13/00* (2013.01); *G01V 3/088* (2013.01)

(58) Field of Classification Search
USPC ................................................. 700/245–264
See application file for complete search history.

(56) References Cited

U.S. PATENT DOCUMENTS

| | | | |
|---|---|---|---|
| 4,661,797 A | 4/1987 | Schmall | |
| 5,539,292 A * | 7/1996 | Vranish | .................. B25J 9/1612 |
| | | | 318/568.16 |
| 10,545,063 B2 * | 1/2020 | Kamiya | .................... G01L 1/16 |
| 2011/0067504 A1 * | 3/2011 | Koyama | .................. G01L 5/226 |
| | | | 73/862.381 |

(Continued)

FOREIGN PATENT DOCUMENTS

| | | |
|---|---|---|
| JP | S59-081090 A | 5/1984 |
| JP | S60-233706 A | 11/1985 |

(Continued)

*Primary Examiner* — Jonathan L Sample
(74) *Attorney, Agent, or Firm* — Harness, Dickey & Pierce, P.L.C.

(57) ABSTRACT

A robot includes a robot body including a base, a first movable section provided turnably with respect to the base, and a second movable section provided turnably with respect to the first movable section, a first proximity sensor for detecting contact with or approach of an object to the first movable section, and a second proximity sensor for detecting contact with or approach of the object to the second movable section. The first proximity sensor includes a first electrode section having a capacitance that changes according to the contact or approach of the object, and a first circuit section for detecting the capacitance of the first electrode section. The second proximity sensor includes a second electrode section having a capacitance that changes according to the contact or approach of the object, and a second circuit section for detecting the capacitance of the second electrode section.

12 Claims, 16 Drawing Sheets

(56) References Cited

U.S. PATENT DOCUMENTS

| | | | |
|---|---|---|---|
| 2013/0041509 A1* | 2/2013 | Saito | B25J 9/047 700/261 |
| 2013/0112010 A1* | 5/2013 | Matsumoto | G01L 5/167 73/862.044 |
| 2015/0114164 A1* | 4/2015 | Urano | H02N 2/004 74/490.03 |
| 2015/0120051 A1* | 4/2015 | Matsuzawa | H01L 41/1132 700/258 |
| 2015/0127159 A1* | 5/2015 | Kamiya | G01L 5/226 700/258 |
| 2016/0103500 A1* | 4/2016 | Hussey | B25J 13/084 345/173 |
| 2016/0361125 A1* | 12/2016 | Balicki | B25J 19/06 |
| 2017/0066130 A1* | 3/2017 | Corkum | B25J 9/1651 |
| 2017/0252921 A1* | 9/2017 | Hynna | A61B 17/00234 |
| 2017/0257094 A1* | 9/2017 | Schupp | H03K 17/955 |

FOREIGN PATENT DOCUMENTS

| | | |
|---|---|---|
| JP | 2003-071778 A | 3/2003 |
| JP | 2003-298402 A | 10/2003 |
| JP | 2003-334777 A | 11/2003 |
| JP | 2010-010116 A | 1/2010 |
| JP | 2012-245575 A | 12/2012 |

* cited by examiner

ROBOT

BACKGROUND

1. Technical Field

The present invention relates to a robot.

2. Related Art

There has been known an industrial robot that performs, for example, work for grasping a work object. Such an industrial robot includes, for example, a base and a robot arm turnably connected to the base and including a plurality of arms. In general, an end effector such as a hand that grasps the work object is attached to the distal end of the robot arm.

In recent years, to achieve prevention of accidents due to collision of an industrial robot and an object such as a human body, a technique for providing a capacitance-type proximity sensor on an arm surface side and sensing an approaching object with the proximity sensor to cause a robot to perform an avoiding operation or a stopping operation has been developed. For example, JP-A-2010-10116 (Patent Literature 1) discloses a robot including a proximity sensor including a detection electrode disposed on the surface of an arm and a detection circuit that outputs, on the basis of a signal from the detection electrode, information corresponding to a change in capacitance due to approach of an object.

However, in the robot described in Patent Literature 1, because the detection electrode and the detection circuit are provided in only one arm, it is difficult to detect approach of an object to another arm. In such a robot, even if detection electrodes are provided in the respective arms, because there is only one detection circuit, the distance between the detection electrodes changes and an output changes according to the operation of the robot and false detection occurs. Therefore, in the robot in the past, it is difficult to sufficiently reduce risk at collision time.

SUMMARY

An advantage of some aspects of the invention is to provide a robot that can reduce risk at collision time.

An advantage of some aspects of the invention is to solve at least a part of the problems described above, and the invention can be realized as the following application examples or forms.

A robot according to an application example includes: a robot body section including a base, a first movable section provided turnably with respect to the base, and a second movable section provided turnably with respect to the first movable section; a first proximity sensor configured to detect contact of an object with or approach of the object to the first movable section; and a second proximity sensor configured to detect contact of the object with or approach of the object to the second movable section. The first proximity sensor includes a first electrode section, capacitance of which changes according to the contact or the approach of the object, and a first circuit section configured to detect the capacitance of the first electrode section. The second proximity sensor includes a second electrode section, capacitance of which changes according to the contact or the approach of the object, and a second circuit section configured to detect the capacitance of the second electrode section.

With such a robot, it is possible to expand a detectable range of the contact of the object with or the approach of the object to the robot body section while reducing false detection. Therefore, it is possible to reduce risk duding collision. Therefore, the robot can be suitably used as a collaborative robot capable of performing collaborative work with a human.

In the robot according to the application example, it is preferable that a first detection time, which is a detection time by the first circuit section, and a second detection time, which is a detection time by the second circuit section, are temporally different.

Consequently, it is possible to reduce, with a relatively simple configuration, false detection due to a decrease in the distance between detection electrodes. Therefore, it is possible to reduce risk at collision time.

In the robot according to the application example, it is preferable that a first threshold, which is a threshold of approach determination by the first circuit section, and a second threshold, which is a threshold of approach determination by the second circuit section, are different.

Consequently, it is possible to reduce risk of collision of the object with a robot arm irrespective of operating speeds of arms.

A robot according to another application example includes: a robot body section including a base and a third movable section provided turnably with respect to the base; a third proximity sensor configured to detect contact of an object with or approach of the object to the third movable section; and a fourth proximity sensor configured to detect contact of the object with or approach of the object to the third movable section. The third proximity sensor includes a third electrode section, capacitance of which changes according to the contact or the approach of the object, and a third circuit section configured to detect the capacitance of the third electrode section. The fourth proximity sensor includes a fourth electrode section, capacitance of which changes according to the contact or the approach of the object, and a fourth circuit section configured to detect the capacitance of the fourth electrode section.

With such a robot, it is possible to suitably detect the contact or the approach of the object while preventing a decrease in an operating ratio of the robot.

In the robot according to the application example, it is preferable that a third threshold, which is a threshold of approach determination by the third circuit section, and a fourth threshold, which is a threshold of approach determination by the fourth circuit section, are different.

Consequently, it is possible to reduce risk of collision of the object with a robot arm irrespective of operating speeds of arms.

A robot according to still another application example includes: a robot body section including a base and a fourth movable section provided turnably with respect to the base; and a fifth proximity sensor configured to detect contact of an object with or approach of the object to the fourth movable section. The fifth proximity sensor includes a fifth electrode section, capacitance of which changes according to the contact or the approach of the object, and a fifth circuit section configured to detect the capacitance of the fifth electrode section. A fifth threshold, which is a threshold of approach determination by the fifth circuit section, is changed according to operation of the robot.

Consequently, it is possible to reduce risk at collision time at any time during the operation of the robot.

In the robot according to the application example, it is preferable that the fifth threshold is changed at each operation step of the robot.

Consequently, it is possible to more accurately reduce risk at collision time.

In the robot according to the application example, it is preferable that the fifth threshold is changed according to operating speed of the robot.

Consequently, it is possible to reduce risk at collision time while reducing deterioration in work efficiency of the robot.

In the robot according to the application example, it is preferable that the fifth threshold is set according to a posture of the robot.

Consequently, it is possible to further reduce risk at collision time while further reducing deterioration in work efficiency of the robot.

In the robot according to the application example, it is preferable that the fifth threshold is set according to a distance to the object present around the robot.

Consequently, it is possible to further improve safety of collision prevention and work efficiency.

In the robot according to the application example, it is preferable that the fifth threshold is changed according to a distance to the object present around the robot.

Consequently, it is possible to further improve safety of collision prevention and work efficiency.

In the robot according to the application example, it is preferable that the fifth threshold is a setting item of teaching of the robot.

Consequently, compared with a method of sequentially changing setting of a threshold of approach detection of a proximity sensor during the operation of a robot arm, it is possible to reduce a computational amount of a control device (a controller) that controls driving of the robot arm.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention are explained in detail below with reference to the accompanying drawings.

First Embodiment

Basic Configuration of a Robot

Figure 1:
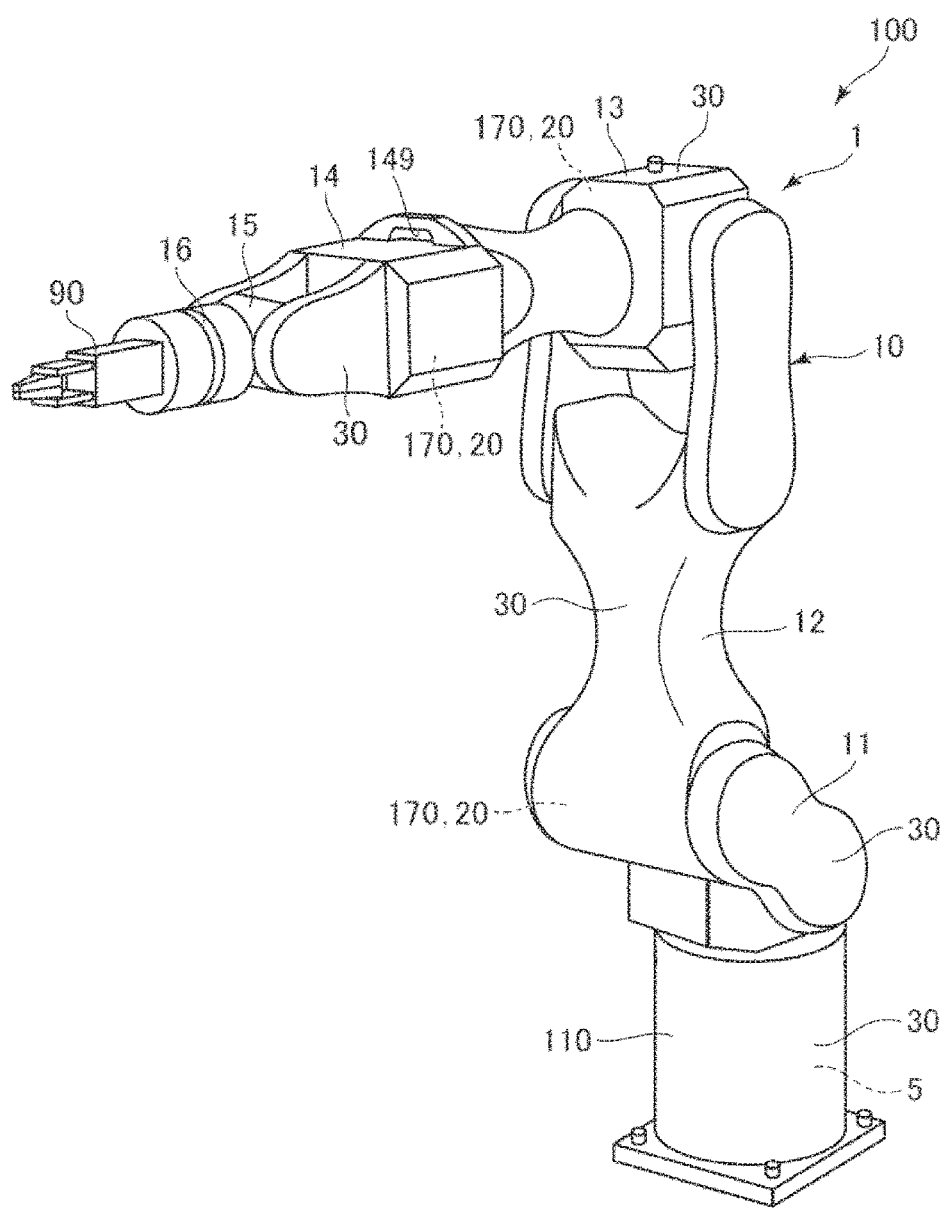
FIG. 1 is a perspective view showing a robot according to a first embodiment.
Figure 2:
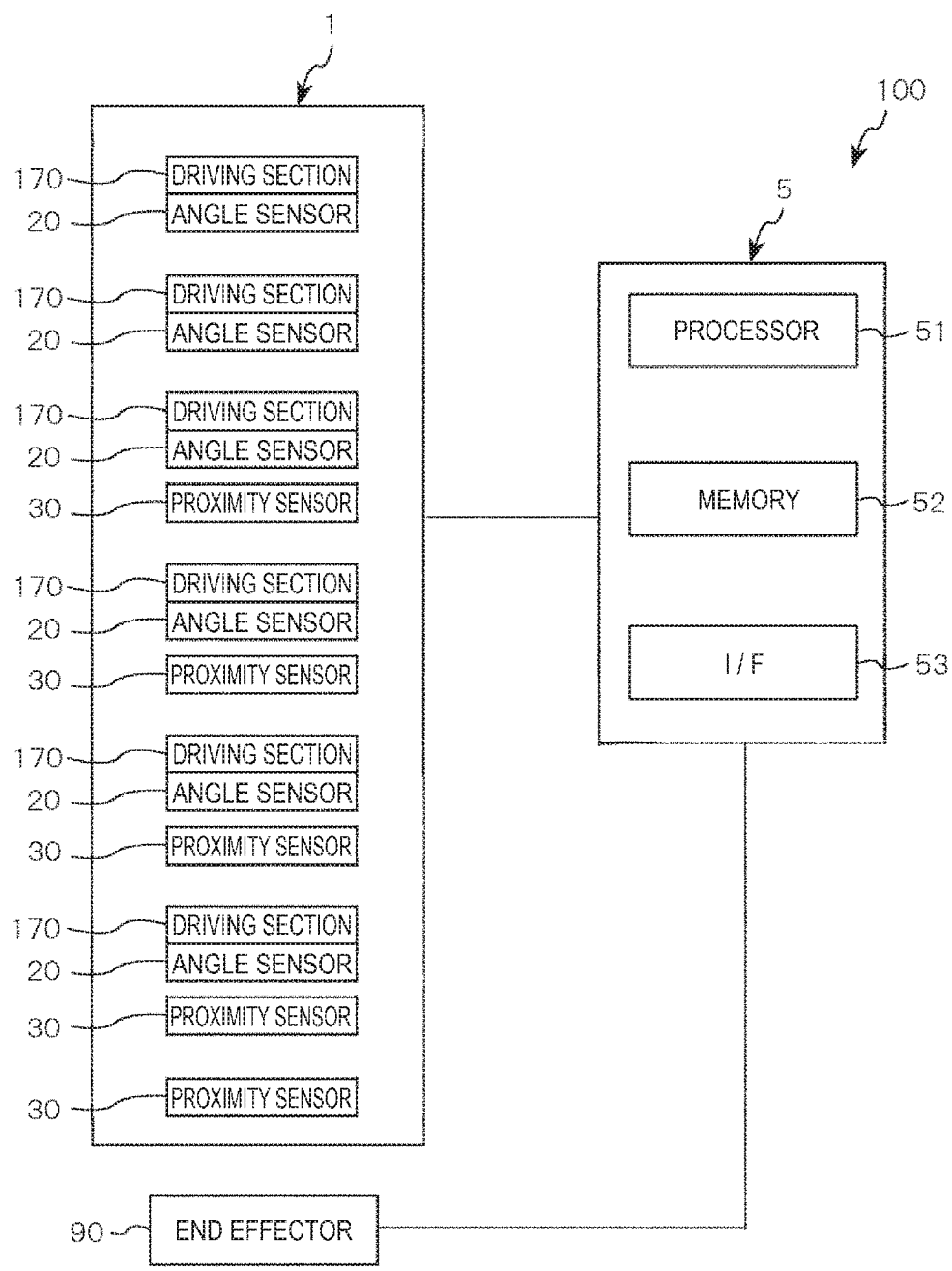
FIG. 2 is a block diagram of the robot shown in FIG. 1.
Figure 3:
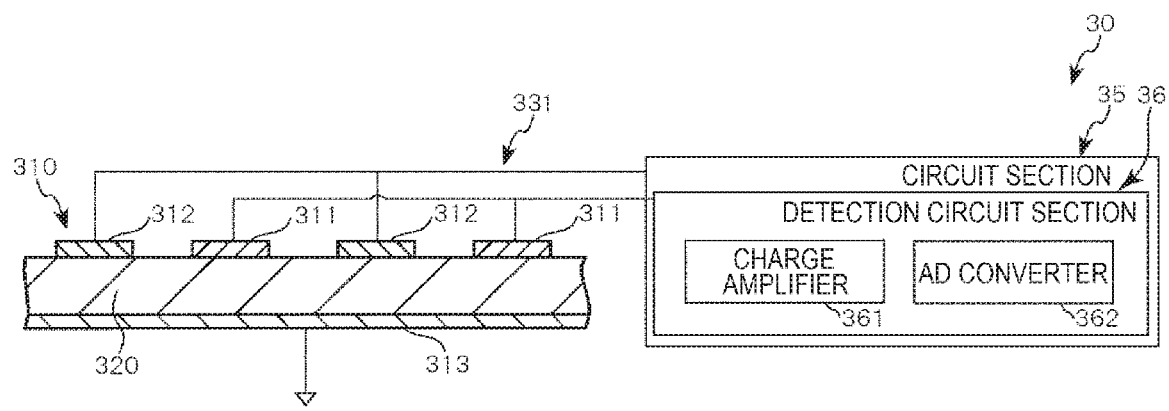
FIG. 3 is a schematic diagram for explaining the configuration of a proximity sensor.
Figure 4:
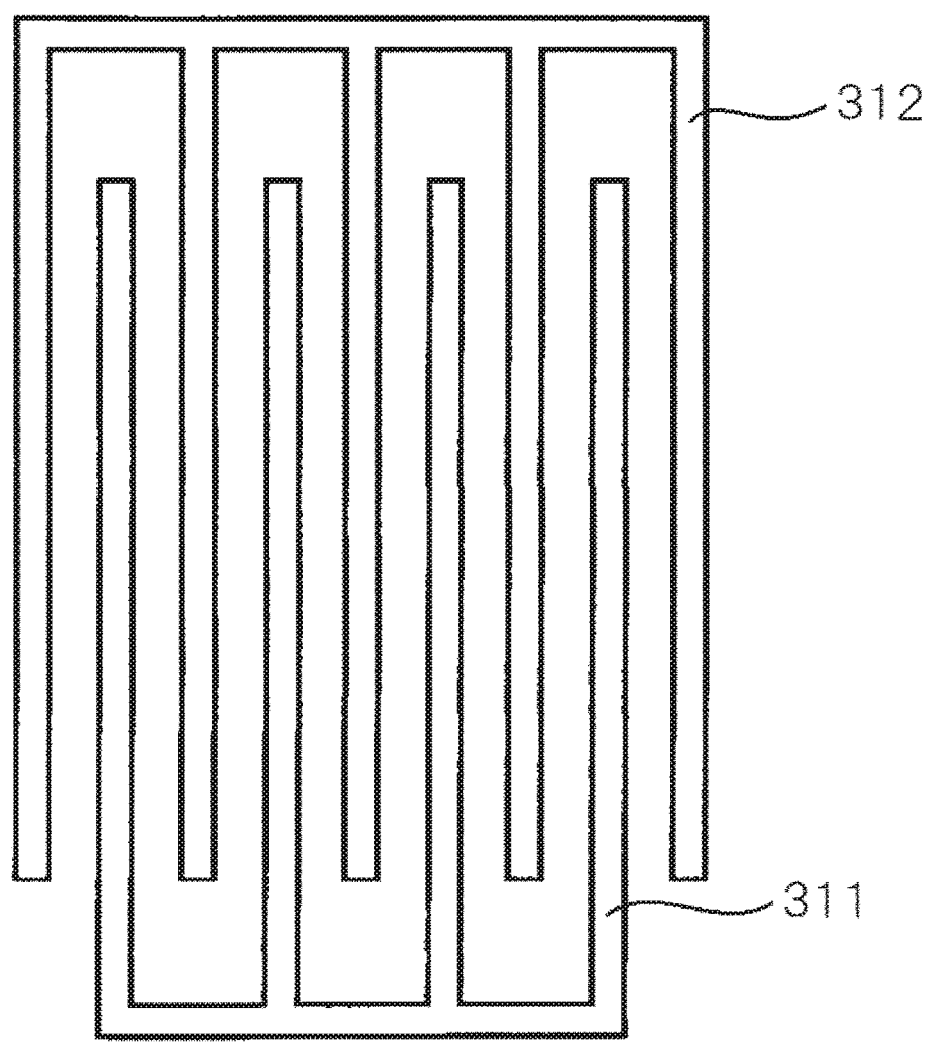
FIG. 4 is a diagram showing an example of disposition of a first electrode (a detection electrode) and a second electrode (a driving electrode).
Figure 5:
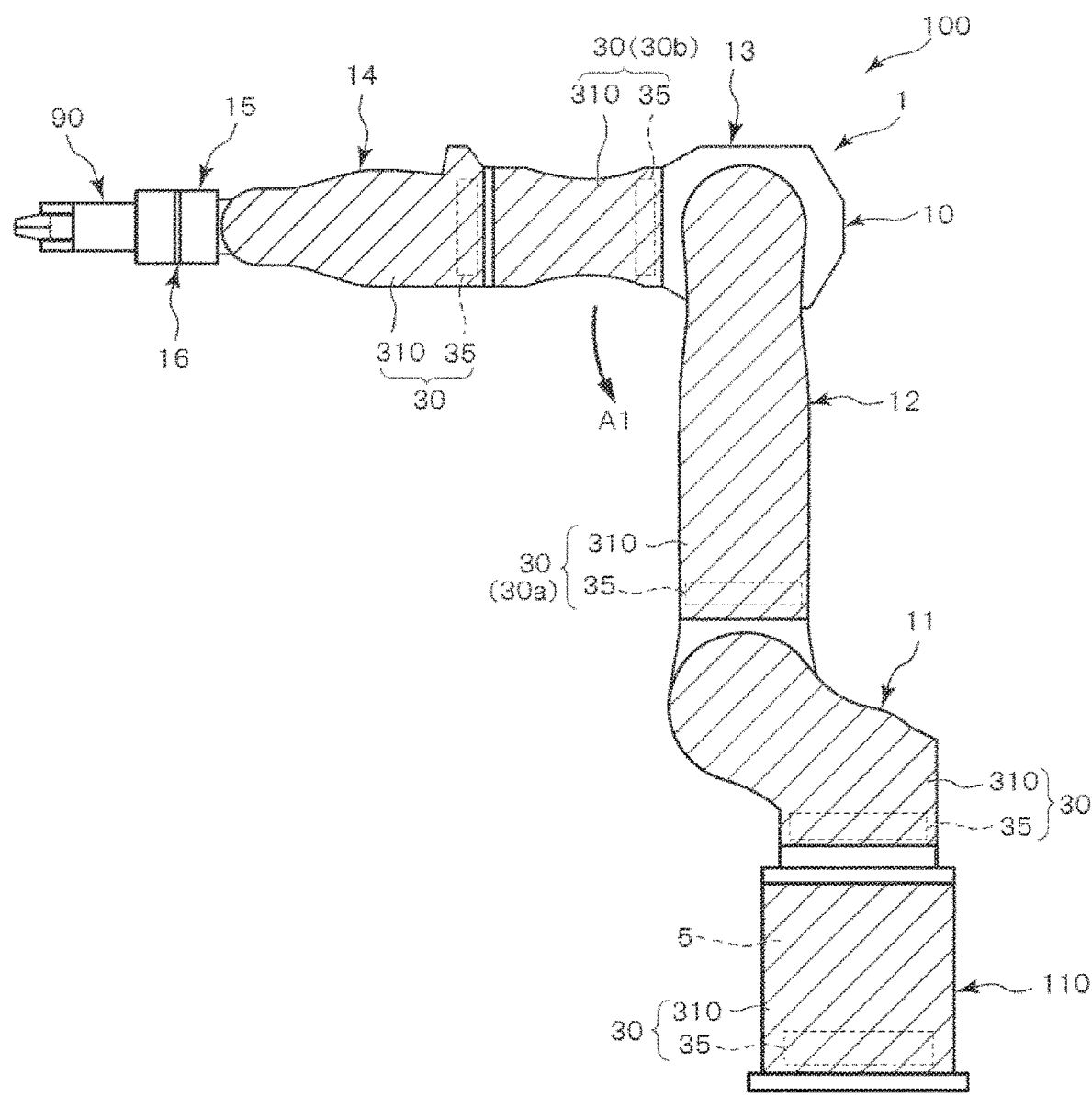
FIG. 5 is a diagram showing disposition of an electrode section and a detection circuit section in a robot body section.

FIG. 1 is a perspective view showing a robot according to a first embodiment. FIG. 2 is a block diagram of the robot shown in FIG. 1. FIG. 3 is a schematic diagram for explaining the configuration of a proximity sensor. FIG. 4 is a diagram showing an example of disposition of a first electrode (a detection electrode) and a second electrode (a driving electrode). FIG. 5 is a diagram showing disposition of an electrode section and a detection circuit section in a robot body section. Note that, in the following explanation, for convenience of explanation, the upper side in FIG. 1 is referred to as "upper" and the lower side in FIG. 1 is referred to as "lower". A base 110 side in FIG. 1 is referred to as "proximal end side" and the opposite side of the base 110 side (an end effector 90 side) is referred to as "distal end side". The up-down direction in FIG. 1 is represented as "vertical direction" and the left-right direction in FIG. 1 is represented as "horizontal direction".

A robot 100 shown in FIG. 1 is a so-called six-axis vertical articulated robot. The robot 100 can perform work such as supply, removal, conveyance, and assembly of a precision instrument and components configuring the precision instrument (work).

As shown in FIG. 1, the robot 100 includes a robot body section 1 including a base 110 and a robot arm 10 and a control device 5 (a controller) configured to control the operation of the robot arm 10. The robot 100 includes a plurality of driving sections 170, a plurality of angle sensors 20, and a plurality of proximity sensors 30 provided in the robot body section 1 (see FIGS. 1 and 2). Note that setting numbers and setting places of the angle sensors 20 and the proximity sensors 30 are not limited to embodiments explained below.

Robot Body Section

Base

The base 110 is fixed to, for example, a floor, a wall, a ceiling, or a movable truck. Note that, although not illustrated in detail, the base 110 includes an exterior member (a housing, a cover, or the like). The control device 5 is housed in an internal space formed by the exterior member.

Robot Arm

The robot arm 10 is turnably supported by the base 110. The robot arm 10 includes an arm 11 (a first arm), an arm 12 (a second arm), an arm 13 (a third arm), an arm 14 (a fourth arm), an arm 15 (a fifth arm), and an arm 16 (a sixth arm, a distal end arm). The arms 11 to 16 are coupled in this order from the proximal end side toward the distal end side of the robot arm 10. The arms 11 to 16 are configured to be relatively turnable with respect to the base 110 and the arms on the proximal end side adjacent to the arms 11 to 16. Note that a connecting portion where two members coupled to each other among the base 110 and the arms 11 to 16 are turnably connected configures a "joint section". Although not illustrated in detail, the arms 11 to 16 respectively include exterior members (housings, covers, or the like). The driving sections 170 and the angle sensors 20 are housed in internal spaces formed by the exterior members.

An end effector 90 configured by, for example, a hand capable grasping a target object is attached to the distal end portion of the arm 16. Note that a connector (not shown in FIG. 1) included in a cable (not shown in FIG. 1) connected to the end effector 90 is connected to a connector inserting section 149 provided in the arm 14. Consequently, the end effector 90 is electrically connected to the control device 5 via a wire (not shown in FIG. 1) provided in the robot arm 10.

Driving Sections

As shown in FIG. 2, the robot 100 includes a plurality of (in this embodiment, six) driving sections 170 as many as the arms 11 to 16. The plurality of driving sections 170 respectively have a function of turning the arms corresponding to the driving sections 170 with respect to the arms (or the base 110) located on the proximal end side of the arms, that is, a function of driving joint sections of the robot arm 10. The driving sections 170 include motor units (not shown in FIG. 2) including motors and brakes and power transmission mechanisms (not shown in FIG. 2) including speed reducers, belts, and pulleys. Note that the driving sections 170 may include motor drivers (not shown in FIG. 2) electrically connected to the control device 5.

Angle Sensors

As shown in FIG. 2, the robot 100 includes a plurality of (in this embodiment, six) angle sensors 20 as many as the driving sections 170. One angle sensor 20 is provided for one driving section 170. The angle sensors 20 detect rotation angles of rotating shafts of the motors or the speed reducers. Consequently, the angle sensors 20 can obtain information such as angles (postures) of the arms on the distal end side with respect to the arms on the proximal end side (information concerning driving states of the joint sections). As such angle sensors 20, for example, a magnetic or optical rotary encoder can be used. Note that the angle sensors 20 are electrically connected to the control device 5 explained below.

Proximity Sensors

As shown in FIGS. 1 and 2, the robot 100 includes five proximity sensors 30. Specifically, one proximity sensor 30 is provided in each of the base 110 and the arms 11 to 14.

The proximity sensors 30 are, for example, capacitance-type sensors that detect a change in capacitance involved in contact or approach of an object such as a person present around the robot 100. In particular, in this embodiment, the proximity sensors 30 are capacitance-type sensors of a mutual capacitance scheme.

As shown in FIG. 3, the proximity sensor 30 includes an electrode section 310 configured to output a signal (electric charge) according to a change in capacitance involved in contact or approach of an object, a circuit section 35 including a detection circuit section 36 configured to process the signal (the electric charge) output from the electrode section 310, and a wire 331 for electrically connecting the electrode section 310 and the circuit section 35. Note that, although not shown in FIG. 3, the wire 331 includes a wire of a driving system for electrically connecting the circuit section 35 and second electrodes 312 and a wire of a signal system for electrically connecting the circuit section 35 (the detection circuit section 36) and first electrodes 311.

The electrode section 310 includes the first electrodes 311 (detection electrodes), the second electrodes 312 (driving electrodes) to which an alternating voltage is applied, and a ground electrode 313 serving as reference potential.

As shown in FIG. 3, the first electrodes 311 and the second electrodes 312 are provided to be separated from each other. As shown in FIG. 4, the first electrode 311 and the second electrode 312 are respectively formed in comb teeth shapes in plan view. Comb teeth of the first electrode 311 and comb teeth of the second electrode 312 are disposed to be separated from each other and mesh with each other. As shown in FIG. 3, the ground electrode 313 is disposed with respect to the first electrodes 311 and the second electrodes 312 via an insulation layer 320.

In such an electrode section 310, an alternating voltage is applied to the second electrodes 312 to generate electric fields between the first electrodes 311 and the second electrodes 312. When an object comes into contact with or approaches the electrode section 310 in this state, the electric fields between the first electrodes 311 and the second electrodes 312 change. The contact or the approach of the object can be detected by detecting, with the first electrodes 311, a change in capacitance due to the change in the electric fields. Note that the ground electrode 313 functions as an electromagnetic shield.

The disposition of the first electrodes 311, the second electrodes 312, and the ground electrode 313 is not limited to the illustrated example and is optional. For example, the ground electrode 313 may be provided on the surface of the insulation layer 320 on the same side as the first electrodes 311 and the like. In this case, the ground electrode 313 may be provided to surround the first electrodes 311 in plan view.

As shown in FIG. 3, the circuit section 35 includes the detection circuit section 36 configured to process electric charge received from the electrode section 310 (specifically, the first electrodes 311) and a driving circuit (not shown in FIG. 3) configured to supply electric power to the second electrodes 312. The detection circuit section 36 includes a charge amplifier 361 (an amplifier circuit) and an AD converter 362 (a conversion output circuit). The charge amplifier 361 converts electric charge output from the first electrodes 311 into a voltage. The AD converter 362 converts the voltage output from the charge amplifier 361 from an analog signal into a digital signal at a predetermined sampling frequency. Information concerning the voltage converted by the AD converter 362 (a digital signal) is transferred to the control device 5.

As shown in FIG. 5, such proximity sensors 30 are respectively provided in the base 110 and the arms 11 to 14. The electrode sections 310 included the proximity sensors 30 are provided in, for example, places indicated by hatching in FIG. 5 and are disposed on the outer surface sides of the base 110 and the arms 11 to 14 (the outer surfaces of the exterior members). The circuit sections 35 (specifically, circuit boards on which the circuit sections 35 are mounted) are provided in, for example, places indicated by broken lines in FIG. 5. Like the electrode sections 310, the circuit sections 35 are disposed on the outer surface sides of the base 110 and the arms 11 to 14 (the outer surfaces of the exterior members). In this way, in the robot 100, one electrode section 310 and one circuit section 35 are provided in each of the base 110 and the arms 11 to 14. Therefore, proximity detection can be performed over a wide range of the robot arm 10. Note that, in this embodiment, the proximity sensors 30 are not provided in the arms 15 and 16. However, the proximity sensors 30 may be provided in the arms 15 and 16 as well. That is, the proximity sensor 30 can also be provided in each of all the arms 11 to 16 included in the robot arm 10. Consequently, the proximity detection can be performed over a wider range.

Control Device

The control device 5 (the controller) shown in FIGS. 1 and 2 has a function of controlling the operation of the robot arm 10 on the basis of detection results of the angle sensors 20 and the proximity sensors 30. The control device 5 includes a processor 51 such as a CPU (Central Processing Unit), a memory 52 such as a ROM (Read Only Memory) or a RAM (Random Access Memory), and an I/F (an interface circuit) 53. The processor 51 reads and executes, as appropriate, computer programs stored in the memory 52, whereby the control device 5 realizes processing such as control of driving of the robot 100, various arithmetic operations, and determination. The I/F 53 is configured to be capable of communicating with the driving sections 170, the angle sensors 20, the proximity sensors 30, and the end effector 90. Although not shown in the drawings, the control device 5 includes a power supply circuit configured to generate electric power necessary for the sections of the control device 5 and the driving sections 170 (the motor drivers).

Note that, in FIG. 1, the control device 5 is provided on the inside of the base 110 of the robot body section 1. However, the control device 5 is not limited to this and may be disposed, for example, on the outside of the robot body section 1. A display device including a monitor such as a display, an input device including a mouse and a keyboard, and the like may be connected to the control device 5.

The basic configuration of the robot 100 is explained above. In such a robot 100, an operation sequence generated in advance by teaching work is stored in the memory 52 of the control device 5. The control device 5 (specifically, the processor 51) sends signals concerning rotating speeds and rotation times to the driving sections 170 according to the operation sequence to drive the driving sections 170. The control device 5 drives the robot arm 10 by driving the driving sections 170. The control device 5 receives signals from the angle sensors 20 and performs feedback control on the basis of the signals.

According to such control of the operation of the robot arm 10 by the control device 5, the robot 100 can accurately perform work corresponding to the operation sequence generated by the teaching in advance.

The control device 5 performs exchange of signals with the proximity sensors 30 while controlling such operation of the robot arm 10. Specifically, for example, the control device 5 receives signals corresponding to a change in capacitance from the proximity sensors 30 while transmitting driving signals and signals for adjusting the intensities of the sensitivities of the proximity sensors 30 to the proximity sensors 30 and determines presence or absence of contact of an object with or approach the object to the robot body section 1 on the basis of the signals. For example, when output values from the proximity sensors 30 are equal to or larger than thresholds (thresholds of proximity detection set in advance), the control device 5 determines that the object comes into contact with or approaches the robot body section 1. When determining that the object comes into contact with or approaches the robot body section 1, the control device 5 sends signals to the driving sections 170 and performs a reduction of operating speed, an operation stop, or switching (reversal) of a moving direction of the robot arm 10. In this way, the control device 5 causes, on the basis of the signals exchanged with the proximity sensors 30, the robot arm 10 to perform an avoiding operation for avoiding the object or a stopping operation.

In this way, the control device 5 can cause, on the basis of the signals received from the proximity sensors 30, the robot arm 10 to perform the avoiding operation for avoiding the object or the stopping operation.

The basic configuration of the robot 100 is explained above. As explained above, the robot 100 includes the robot body section 1 including the base 110 and the robot arm 10 provided turnably with respect to the base 110 and including the plurality of arms 11 to 16, the end effector 90 being attachable to the robot arm 10, and the proximity sensors 30 configured to detect contact of an object with or approach of the object to the robot body section 1. The proximity sensors 30 include the electrode sections 310 configured to output signals according to a change in capacitance involved in the contact or the approach of the object and the circuit sections 35 configured to process the signals. The electrode sections 310 and the circuit sections 35 are provided in at least two arms (in this embodiment, four arms 11 to 14) among the plurality of arms 11 to 16.

With such a robot 100, because the proximity sensor 30 is provided in each of the plurality of arms 11 to 14, it is possible to expand a detectable range of contact of an object with or approach of the object to the robot body section 1. One circuit section 35 performs processing of a signal received from one electrode section 310. The circuit section 35 and the electrode section 310 are provided in the same arm. Therefore, a positional relation between the circuit section 35 and the electrode section 310 does not fluctuate and false detection can be reduced. Consequently, it is possible to reduce risk at collision time. Therefore, the robot 100 can be suitably used as a collaborative robot capable of performing collaborative work with a human.

Detailed Explanation of the Proximity Sensors

The proximity sensors 30 are explained in detail. Specifically, detection timings of the proximity sensors 30 are explained.

Figure 6:
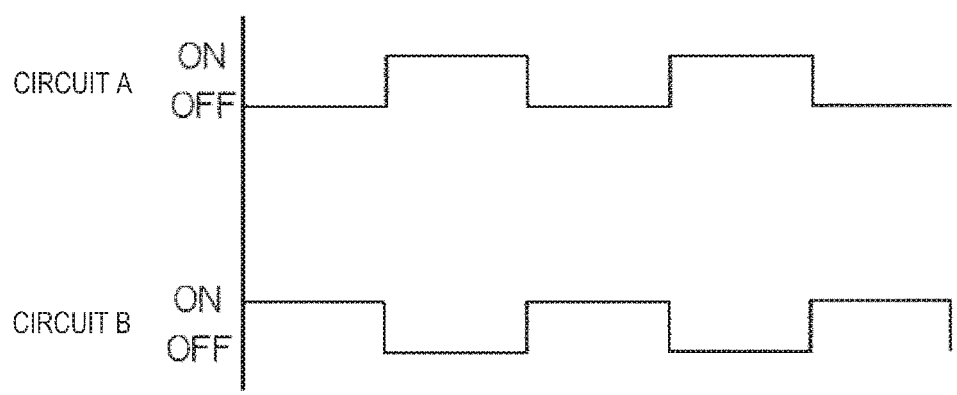
FIG. 6 is a diagram showing detection timings of proximity sensors provided in two arms.

FIG. 6 is a diagram showing detection timings of the proximity sensors provided in the two arms.

In the robot 100 according to this embodiment, the proximity sensor 30 provided in the arm 12 (hereinafter referred to as "proximity sensor 30a" as well) and the proximity sensor 30 provided in the arm 13 (hereinafter referred to as "proximity sensor 30b" as well) are different in detection timings by the circuit sections 35 (see FIGS. 5 and 6).

Specifically, the control device 5 includes a switching element (not shown in the drawings) configured to switch conduction and interruption of paths of electric current to the circuit section 35 included in the proximity sensor 30a and the circuit section 35 included in the proximity sensor 30b and a circuit (not shown in the drawing) configured to control the switching of the conduction and the interruption of the switching element on the basis of a predetermined control signal. For example, as shown in FIG. 6, the control device 5 switches the conduction and the interruption of the paths of the electric current to the circuit sections 35 at a cycle of a predetermined equal interval. A "circuit A" in FIG. 6 is the circuit section 35 included in the proximity sensor 30a. A "circuit B" is the circuit section 35 included in the proximity sensor 30b. When the control device 5 sets the conduction of the path of the electric current to the circuit section 35 included in the proximity sensor 30a to an ON state (valid), the control device 5 sets the conduction of the path of the electric current to the circuit section 35 included in the proximity sensor 30b to an OFF state (invalid). Conversely, when the control device 5 sets the conduction of the path of the electric current to the circuit section 35 included in the proximity sensor 30b to the ON state (valid), the control device 5 sets the conduction of the path of the electric current to the circuit section 35 included in the proximity sensor 30a to the OFF state (invalid).

By switching the conduction and the interruption of the paths of the electric current to the circuit section 35 of the proximity sensor 30a and the circuit section 35 of the proximity sensor 30b in this way, it is possible to shift timings of current supply to the electrode section 310 (specifically, the second electrode 312) included in the proximity sensor 30a and the electrode section 310 (specifically, the second electrode 312) included in the proximity sensor 30b. As a result, it is possible to shift timings, that is, detection timings of signals output from the circuit sections 35 of the proximity sensors 30a and 30b to the control device 5. Note that the detection timings by the circuit sections 35 (specifically, the detection circuit sections 36) of the proximity sensors 30a and 30b are the same as the timings of the conduction and the interruption of the paths of the electric current to the circuit sections 35 shown in FIG. 6.

In this way, in the robot 100 according to this embodiment, the detection timings by the circuit sections 35 are different in each of the arms 12 and 13.

Consequently, it is possible to reduce, with a relatively simple configuration, false detection due to a decrease in the distance between the electrode sections 310, that is, false detection due to interference between the electrode sections 310 even if the arm 13 approaches the arm 12. Therefore, it is possible to reduce risk at collision time. Specifically, as explained above, it is possible to shift the timings of the current supply to the electrode section 310 included in the proximity sensor 30a and the electrode section 310 included in the proximity sensor 30b. Therefore, for example, even if the arm 13 shown in FIG. 5 moves in an arrow A1 direction and approaches the arm 12, it is possible to reduce or prevent interference between the electrode sections 310 provided in the arms 12 and 13. Therefore, it is possible to reduce or prevent a change in capacitance due to the interference between the electrode sections 310. Therefore, it is possible to reduce false detection. Therefore, it is possible to prevent the avoiding operation or the stopping operation of the robot 100 due to the interference between the electrode sections 310. Accordingly, it is possible to prevent a decrease in an operating ratio of the robot 100.

Note that, in this embodiment, the detection timings by the circuit section 35 are different for each of the arms 12 and 13. However, the detection timing by the circuit section 35 may be different in each of the other arms. In that case, it is desirable that the detection timings are shifted, for example, between the arms adjacent to each other or the arms interfering with each other. The arms interfering with each other are arms approaching each other during the operation of the robot arm 10. A method of switching the detection timing is not limited to the method by the control device 5 explained above and may be other methods if the detection timing can be switched.

Second Embodiment

Figure 7:
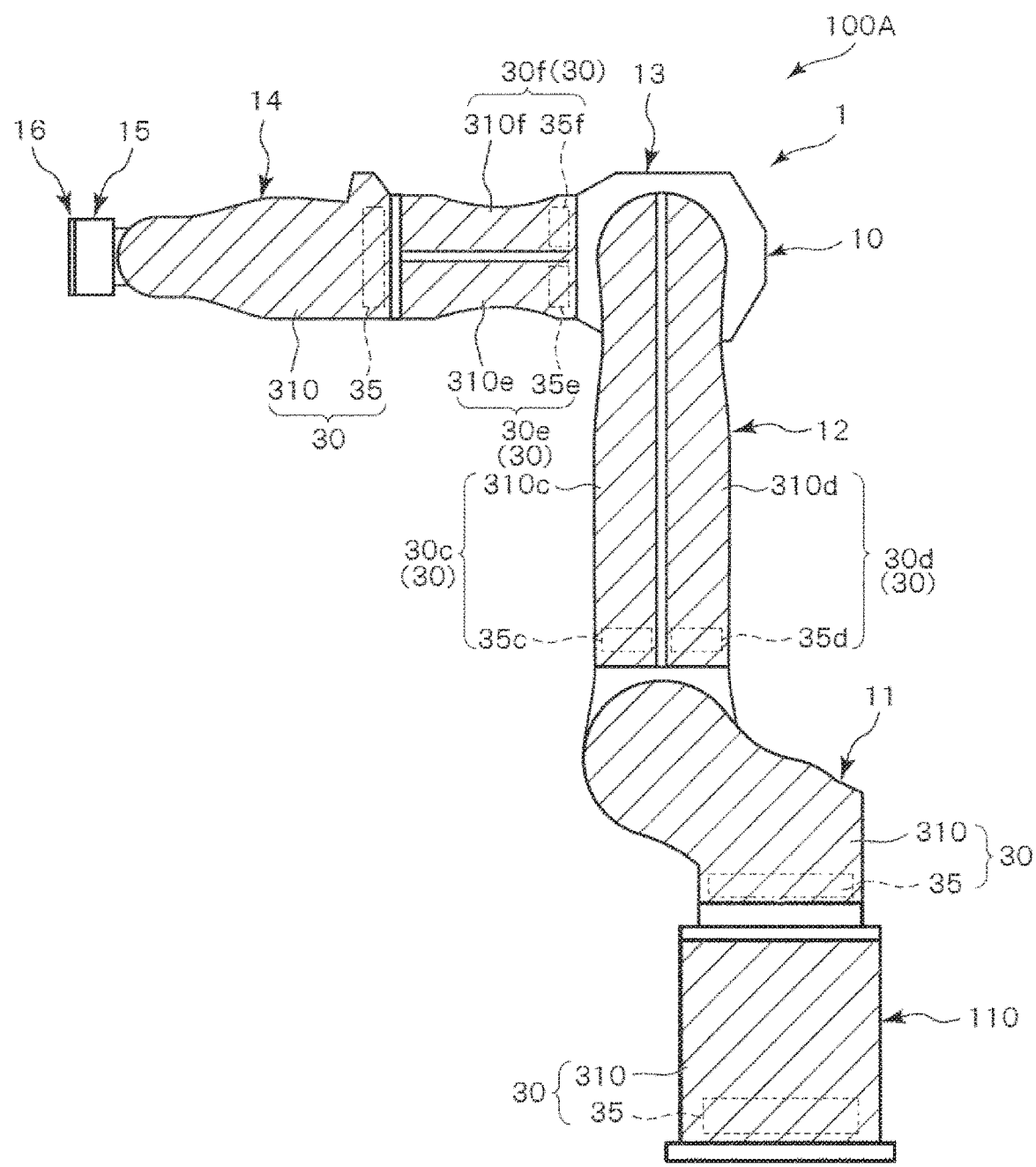
FIG. 7 is a diagram showing disposition of proximity sensors included in a robot according to a second embodiment.
Figure 8:
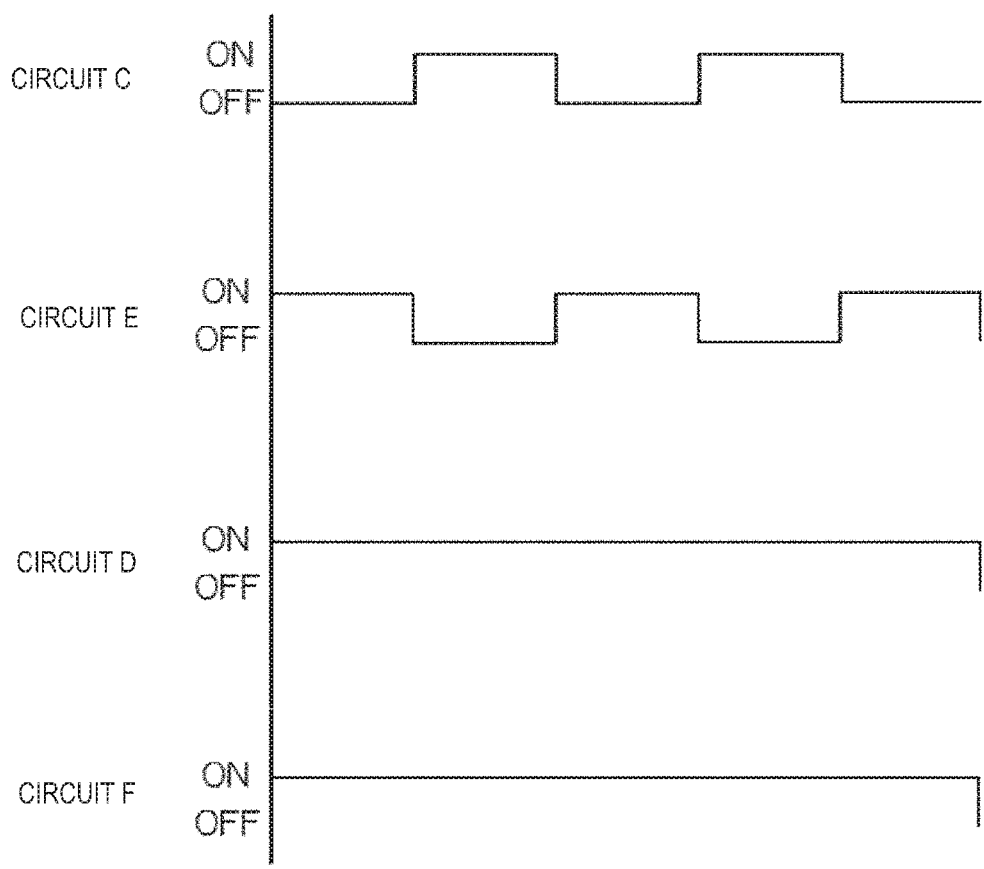
FIG. 8 is a diagram showing detection timings of proximity sensors provided in two arms.

FIG. 7 is a diagram showing disposition of proximity sensors included in a robot according to a second embodiment. FIG. 8 is a diagram showing detection timings of proximity sensors provided in two arms. Note that illustration of the end effector 90 is omitted in FIG. 7.

The second embodiment is explained below. Differences from the first embodiment are mainly explained. Explanation of similarities to the first embodiment is omitted.

This embodiment is different from the first embodiment in disposition and detection timings of the proximity sensors.

As shown in FIG. 7, two proximity sensors 30 are provided in each of the arm 12 and the arm 13 included in a robot 100A. Specifically, in the arm 12, a proximity sensor 30c including an electrode section 310c and a circuit section 35c and a proximity sensor 30d including an electrode section 310d and a circuit section 35d are provided. In the arm 13, a proximity sensor 30e including an electrode section 310e and a circuit section 35e and a proximity sensor 30f including an electrode section 310f and a circuit section 35f are provided.

In the robot 100A according to this embodiment, detection timings by the circuit section 35c and the circuit section 35e are different. On the other hand, proximity detection is always possible in the circuit section 35d and the circuit section 35f.

Specifically, although not illustrated in detail, the control device 5 includes a switching element configured to switch conduction and interruption of paths of electric current to the circuit section 35c and the circuit section 35e and a circuit configured to control the switching of the conduction and the interruption of the switching element. For example, as shown in FIG. 8, the control device 5 switches the conduction and the interruption of the paths of the electric current to the circuit section 35c and the circuit section 35e at a cycle of a predetermined equal interval. A "circuit C" in FIG. 8 is the circuit section 35c. A "circuit D" in FIG. 8 is the circuit section 35d. A "circuit E" in FIG. 8 is the circuit section 35e. A "circuit F" in FIG. 8 is the circuit section 35f. On the other hand, as shown in FIG. 8, paths of electric current to the circuit section 35d and the circuit section 35f is always conducted.

By switching the conduction and the interruption of the paths of the electric current to the circuit section 35c and the circuit section 35e in this way, it is possible to shift timings of current supply to the electrode section 310c and the electrode section 310e. As a result, it is possible to shift detection timings by the circuit sections 35c and 35e. Note that the detection timings by the circuit sections 35c and 35e are the same as the timings of the conduction and the interruption of the paths of the electric current to the circuit sections 35c and 35e shown in FIG. 8.

In this way, in the robot 100A according to this embodiment, the detection timing by the circuit section 35c provided in the arm 12 and the detection timing by the circuit section 35e provided in the arm 13 are different. Consequently, as in the first embodiment explained above, even if the arm 13 approaches the arm 12, false detection due to a decrease in the distance between the electrode section 310c and the electrode section 310e can be reduced. Therefore, it is possible to reduce risk at collision time.

In the robot 100A according to this embodiment, a plurality of proximity sensors 30c and 30d are provided for one arm 12. That is, a plurality of electrode sections 310c and 310d and a plurality of circuit sections 35c and 35d are provided for one arm 12. Detection timings by the plurality of circuit sections 35c and 35d provided in one arm 12 are different in each of the circuit sections 35c and 35d. In this embodiment, the circuit section 35c performs the proximity detection in some cases and does not perform the proximity detection in other cases. The circuit section 35d always performs the proximity detection. In this way, the detection timings by the circuit sections 35c and 35d are different.

Similarly, a plurality of proximity sensors 30e and 30f are provided for one arm 13. That is, a plurality of electrode sections 310e and 310f and a plurality of circuit sections 35e and 35f are provided for one arm 13. Detection timings by the plurality of circuit sections 35e and 35f provided in one arm 13 are different. In this embodiment, the circuit section 35e performs the proximity detection in some cases and does not perform the proximity detection in other cases. The circuit section 35f always performs the proximity detection. In this way, the detection timings by the circuit sections 35e and 35f are different.

In this way, in the circuit sections 35c and 35e provided in places where interference between the arms 12 and 13 could occur, ON/OFF of the proximity detection is switched at a predetermined cycle such that the circuit sections 35c and 35e do not interfere with each other. On the other hand, the circuit sections 35d and 35f provided in places where interference between the arms 12 and 13 does not occur always perform the proximity detection. Consequently, it is possible to suitably detect contact or approach of an object while preventing a decrease in an operating ratio of the robot 100.

According to the second embodiment explained above, it is possible to exert the same effects as the effects in the first embodiment.

Third Embodiment

Figure 9:
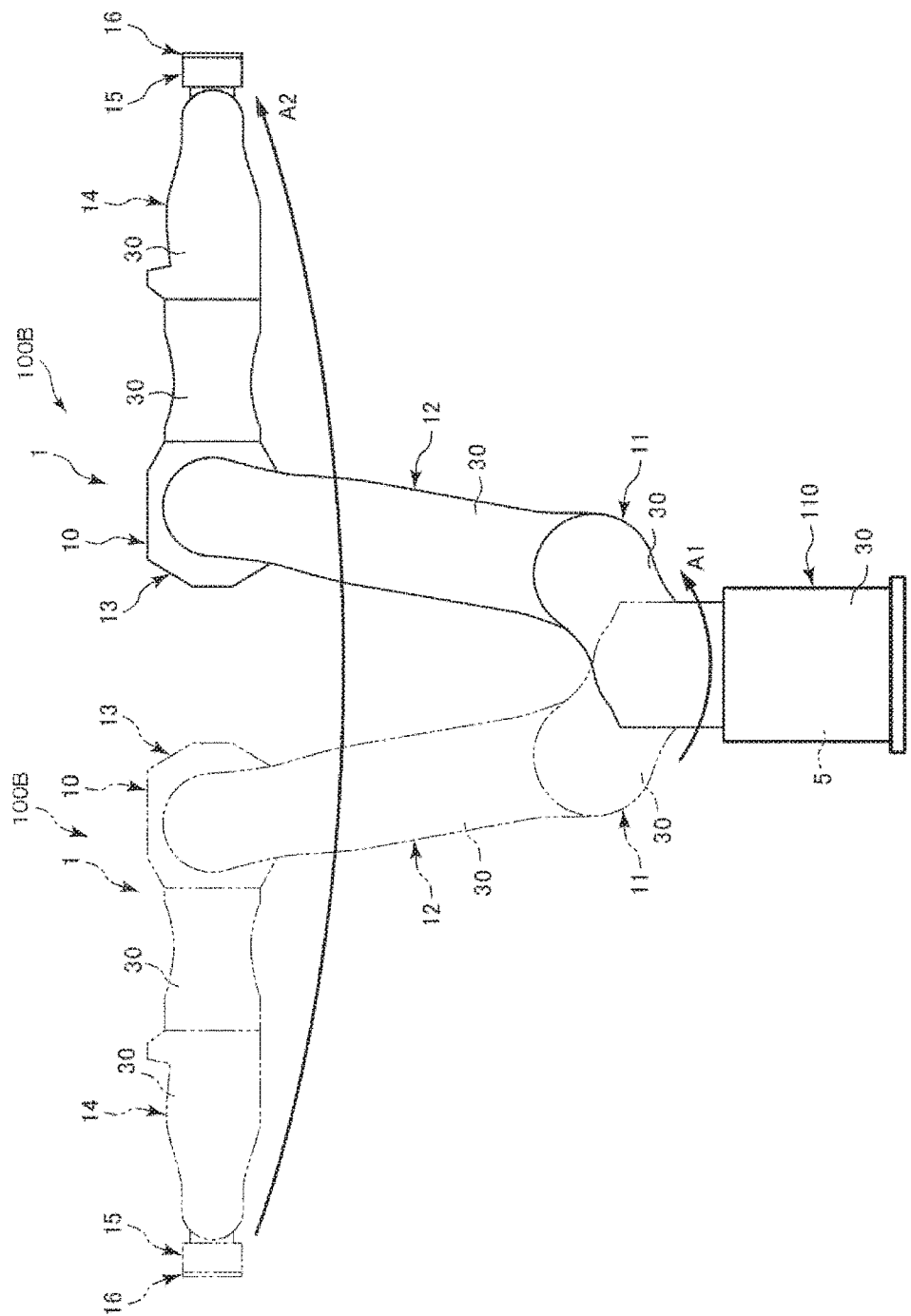
FIG. 9 is a diagram for explaining an example of the operation of a robot according to a third embodiment.
Figure 10:
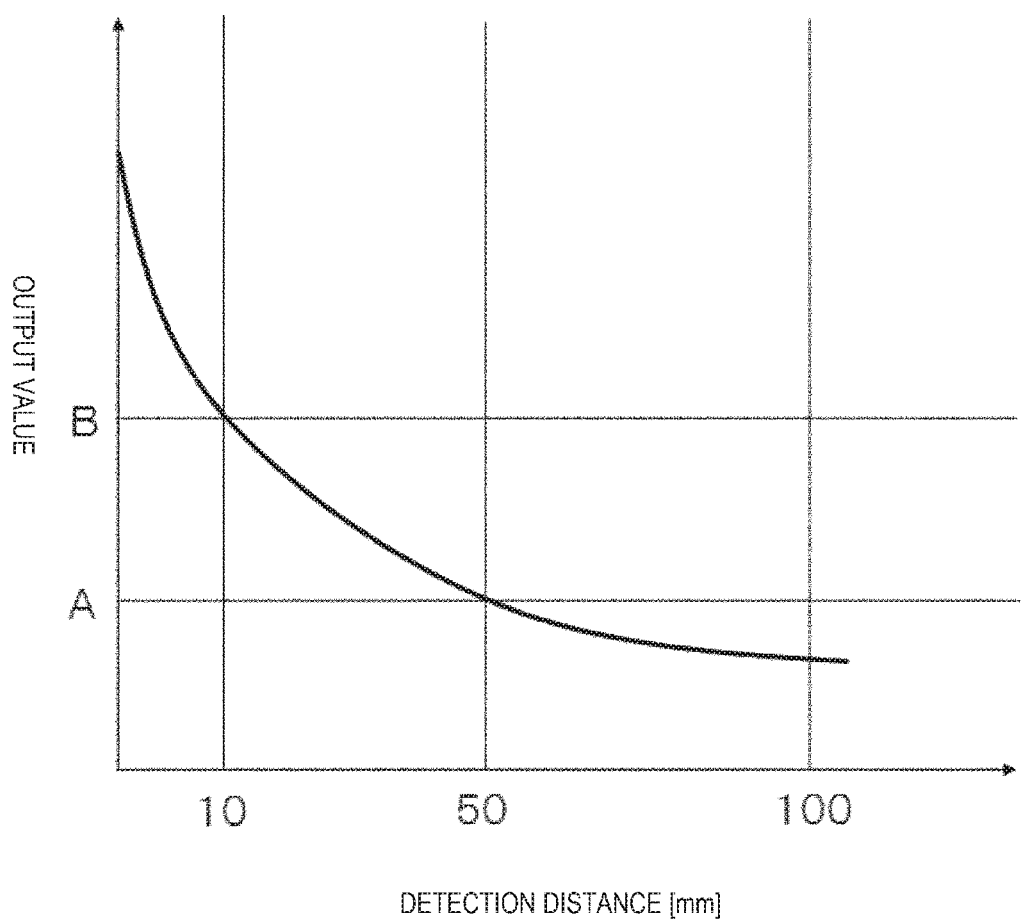
FIG. 10 is a diagram showing a relation between an output value from a proximity sensor and a detection distance.
Figure 11:
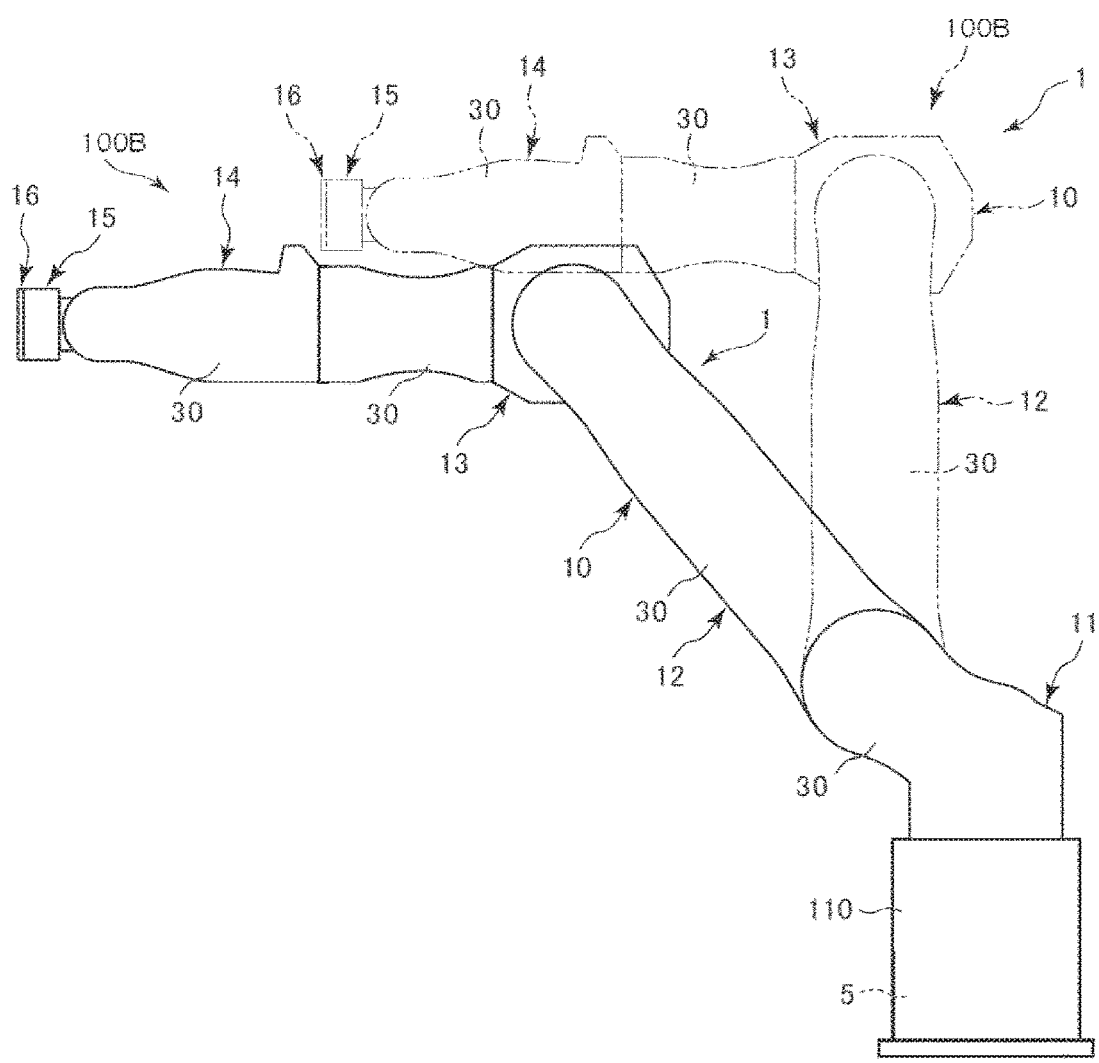
FIG. 11 is a diagram showing an example in which a posture of a robot arm changes.
Figure 12:
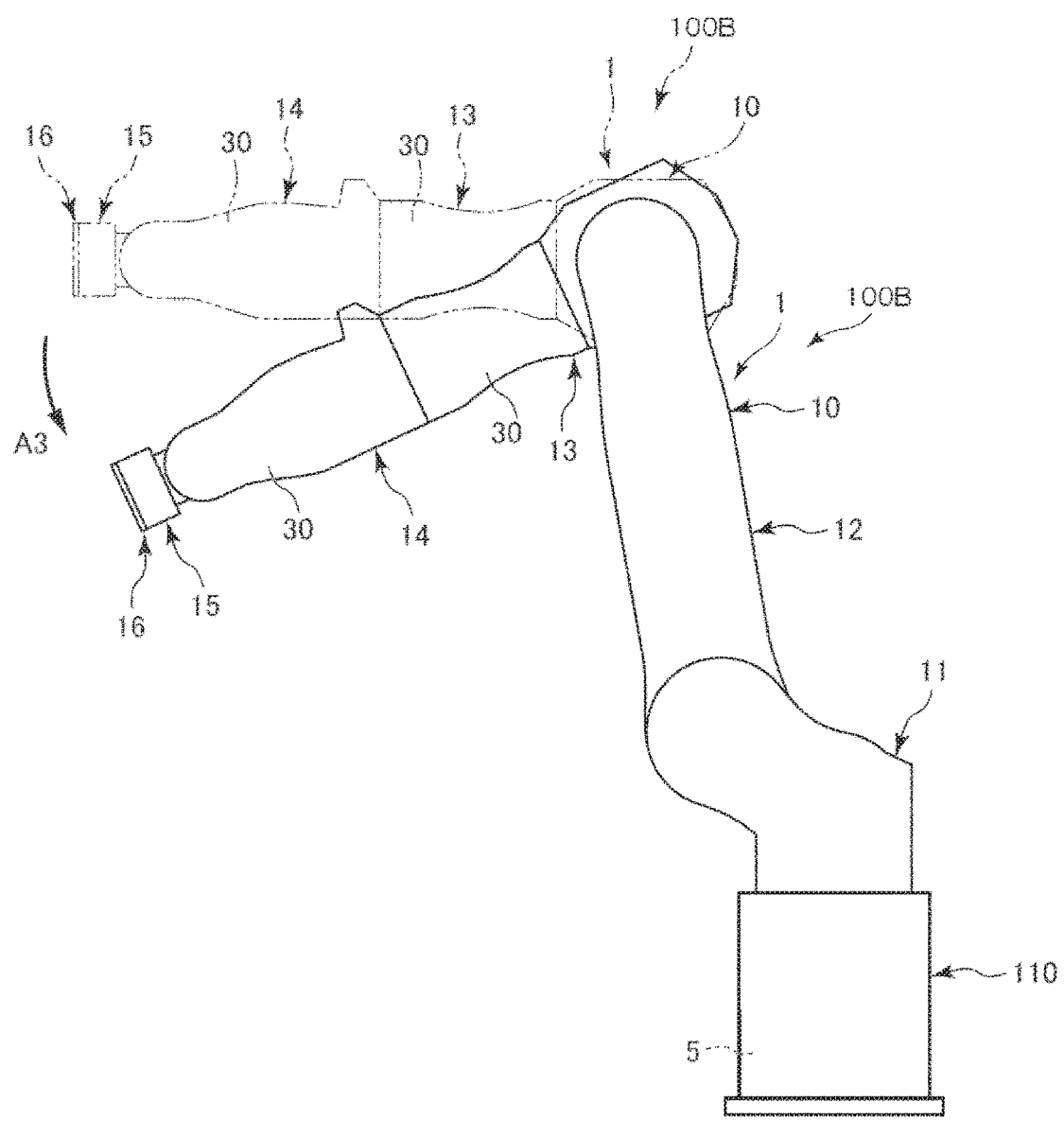
FIG. 12 is a diagram showing an example in which a part of arms included in the robot arm operates.
Figure 13:
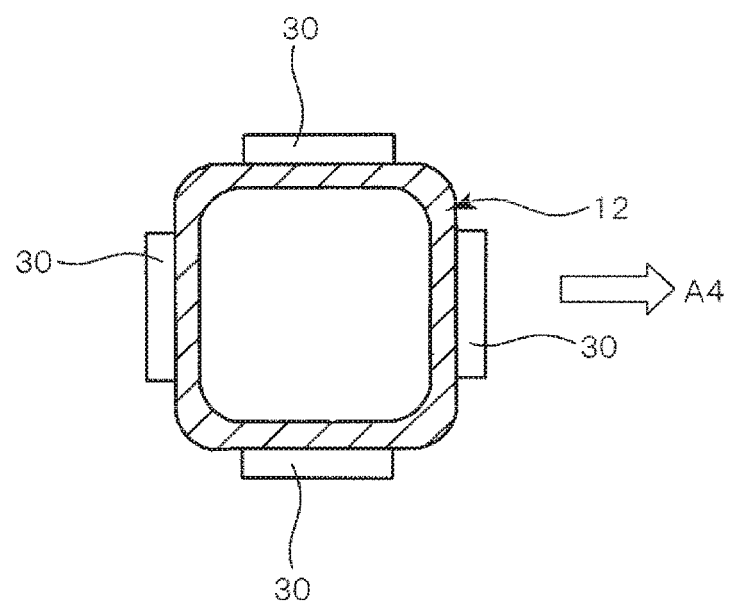
FIG. 13 is a diagram schematically showing a cross section of the arm.
Figure 14:
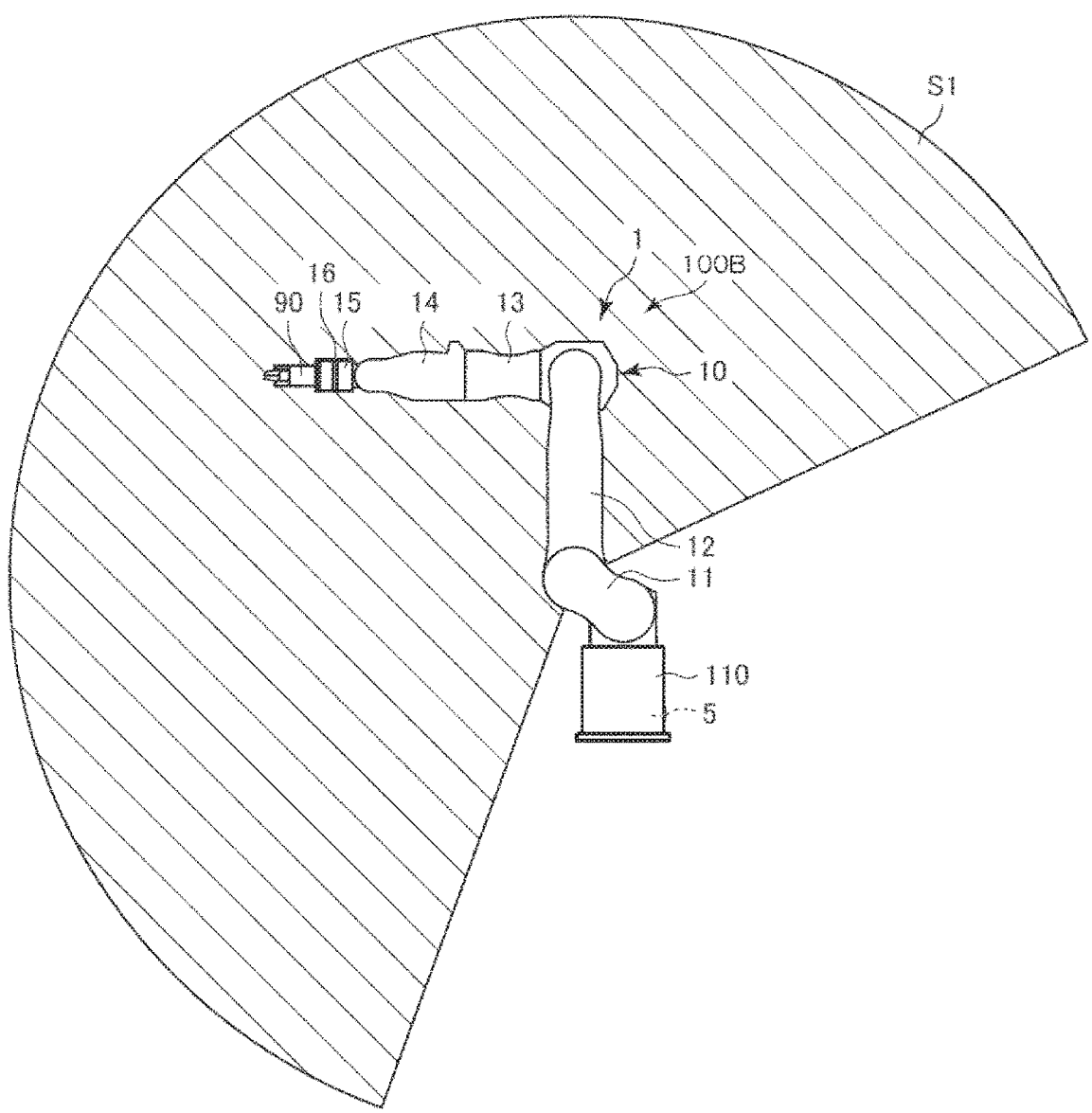
FIG. 14 is a diagram showing an operation range of the robot arm and an end effector.

FIG. 9 is a diagram for explaining an example of the operation of a robot according to a third embodiment. FIG. 10 is a diagram showing a relation between an output value from a proximity sensor and a detection distance. FIG. 11 is a diagram showing an example in which a posture of a robot arm changes. FIG. 12 is a diagram showing an example in which a part of arms included in the robot arm operates. FIG. 13 is a diagram schematically showing a cross section of the arm. FIG. 14 is a diagram showing an operation range of the robot arm and the end effector. Note that illustration of the end effector 90 is omitted in FIGS. 9, 11, and 12.

The third embodiment is explained below. Differences from the embodiments explained above are mainly explained. Explanation of similarities to the embodiments is omitted.

This embodiment is different from the first embodiment in that (detection sensitivities) of proximity detection of proximity sensors are different for each proximity sensor.

In a robot 100B according to this embodiment, thresholds (detection sensitivities) of proximity detection of the proximity sensors 30 provided in the arm 11, the arm 12, the arm 13, and the arm 14 are set to be larger in this order. Therefore, the threshold of the proximity detection of the proximity sensor 30 provided in the arm 11 is set smallest. The threshold of the proximity detection of the proximity sensor 30 provided in the arm 14 is set largest. Note that, in FIG. 9, illustration of the electrode sections 310 and the circuit sections 35 included in the proximity sensors 30 is omitted. However, the disposition of the electrode sections 310 and the circuit sections 35 are the same as the disposition in the first embodiment.

For example, when a state of the robot arm 10 indicated by an alternate long and short dashes line in FIG. 9 is changed to a state of the robot arm 10 indicated by a solid line in FIG. 9 by horizontally rotating the robot arm 10 in an arrow A2 direction with respect to the base 110 without changing the posture of the robot arm 10, operating speed of the arm 14 is higher than operating speed of the arm 11. For example, when the distance between the arm 14 and the base 110 is ten times as large as the distance between the arm 11 and the base 110 when viewed from the vertical direction, the operating speed of the arm 14 is ten times as high as the operating speed of the arm 11. In this case, the proximity sensor 30 provided in the arm 14 needs to detect an object at a distance ten times as large as the distance of the proximity sensor 30 provided in the arm 11 before the control device 5, for example, stops driving of the robot arm 10 after the proximity sensor 30 detects approach of the object. Therefore, the robot 100B sets detection distances corresponding to operating speeds of the arms 11 to 16.

The setting of the detection distances corresponding to the operating speeds of the arms 11 to 16 is performed by, for example, a method explained below.

The operating speeds of the arms 11 to 16 (e.g., the distal end portions of the arms 11 to 16) can be determined on the basis of rotating speeds of the motors of the driving sections 170 corresponding to the arms 11 to 16 and distances among rotating shafts of the driving sections 170. For example, because the operation of the robot 100B is taught in advance, present operating speeds of the arms 11 to 16 can be calculated. The present operating speeds of the arms 11 to 16 may be calculated on the basis of signals received from the angle sensors 20. A three-axis acceleration sensor (not shown in FIG. 9) may be attached to the robot 100B. The present operating speeds of the arms 11 to 16 may be calculated by time integration of an output of the three-axis acceleration sensor.

The detection distances correspond to output values from the proximity sensors 30. The detection distances can be set by setting thresholds of the output values. A solid line curve shown in FIG. 10 represents a characteristic of the output value from the proximity sensor 30 with respect to the detection distance. For example, as shown in FIG. 10, when the threshold of the output value of the proximity sensor 30 is set to "A", the detection distance can be set to 50 mm. When the threshold of the output value of the proximity sensor 30 is set to "B", the detection distance can be set to 10 mm.

The control device 5 sets detection distances corresponding to the operating speed of the arms 11 to 16 on the basis of the operating speeds calculated by the method explained above, the output values from the proximity sensors 30, and the detection distances.

In this way, the robot 100B according to this embodiment is capable of setting the thresholds of the proximity detection for detecting contact or approach of an object in the plurality of proximity sensors 30.

Consequently, it is possible to prevent a situation in which the operation of the robot arm 10 stops and work efficiency is deteriorated even if an object approaches at a distance at which the robot arm 10 does not need to stop. Conversely, it is possible to prevent a situation in which a braking distance is insufficient and the robot arm 10 collides with an object such as a person.

As explained above, the thresholds of the proximity detection are different for each of the plurality of arms 11 to 14.

Consequently, even the arms 11 to 14 having different operating speeds can be stopped not to collide with an object after the object is detected. Therefore, it is possible to reduce risk of collision of the object with the robot arm 10 irrespective of the operating speeds of the arms. By setting the thresholds of the proximity detection of the proximity sensors 30 (the thresholds of the output values from the proximity sensors 30) according to the operating speeds of the arms 11 to 14, an approach distance can be set shorter when the object approaches the arm 11 having the low operating speed than when the object approaches the arm 14 having the high operating speed. Therefore, an operator can perform work in a place close to the arm 11.

As shown in FIG. 11, the operating speed of the arm 16 with respect to the arm 11 is higher when the robot arm 10 is horizontally rotated with respect to the base 110 in a posture of the robot arm 10 indicated by a solid line in FIG. 11 than when the robot arm 10 is horizontally rotated with respect to the base 110 in a posture of the robot arm 10 indicated by an alternate long and two short dashes line in FIG. 11. Therefore, the thresholds of the proximity detection are desirably set according to the posture of the robot arm 10.

Consequently, by performing the setting of the thresholds of the proximity detection according to the posture of the robot arm 10 and the operating speeds of the arms 11 to 16 corresponding to the posture of the robot arm 10, it is possible to further reduce risk at collision time while further reducing deterioration in work efficiency of the robot 100B.

As shown in FIG. 12, when a state of the robot arm 10 indicated by an alternate long and two short dashes line in FIG. 12 is changed to a state of the robot arm 10 indicated by a solid line in FIG. 12 by rotating the arms 13 to 16 in an arrow A3 direction, the arms 13 to 16 operate but the arms 11 and 12 do not operate. In this case, the arms 11 and 12 do not collide with an object around the arms 11 and 12. Therefore, it is desirable to set the detection distances in the proximity sensors 30 in the arms 11 and 12 to 0 (zero) and set the thresholds of the proximity detection such that the arms 11 and 12 stop when the arms 11 and 12 come into contact with the object.

As shown in FIG. 13, when the proximity sensors 30 are attached to four places on the outer circumferential surface of one arm (e.g., the arm 12) and the arm 12 operates in an arrow A4 direction, the arm 12 does not come into contact with an object around the arm 12 from the upper side, the lower side, and the left side in FIG. 13. Therefore, it is desirable to set detection distances in the proximity sensors 30 located on the upper side, the lower side, and the left side in FIG. 13 of the arm 12 to 0 (zero) and set the threshold of the proximity detection such that the arm 12 stops when the arm 12 comes into contact with the object. By setting the detection distances in the proximity sensors 30 considering an operating direction of the arm 12 and setting positions of the proximity sensors 30 in this way, it is possible to further reduce risk at collision time while further reducing deterioration in work efficiency.

As shown in FIG. 14, when an object is located outside an operation range S1 of the robot arm 10 and the end effector 90, risk of collision of the robot arm 10 and the end effector 90 with the object is low. Therefore, when the object is present outside the operation range S1, it is unnecessary to stop the robot 100B during the operation of the robot 100B. Therefore, in this case, for example, the detection distances of all the proximity sensors 30 provided in the robot body section 1 are set to 0 (zero) and the thresholds of the proximity detection are set such that the robot body section 1 stops when the robot body section 1 comes into contact with the object. Alternatively, the thresholds of the proximity detection may be set not to detect contact or approach of the object. On the other hand, when an object is located within the operation range S1, risk of collision of the robot arm 10 and the end effector 90 with the object is high. Therefore, the thresholds of the proximity detection are set such that the object can be detected earlier than usual.

In this way, the thresholds of the proximity detection are set according to the distance to the object present around the robot 100B. That is, for an object, a schematic positional relation of which with the robot 100B is known in advance, it is desirable to set the thresholds as explained above.

Consequently, it is possible to further improve safety of collision prevention and work efficiency.

As means for measuring the schematic positional relation between the robot 100B and the object, a sensor provided separately from the robot 100B is used. As the sensor, various sensors such as a camera, a laser scanner, a pressure mat, and an ultrasonic sensor can be used. Note that the control device 5 included in the robot 100B only has to be configured to be capable of acquiring a signal from the sensor.

According to the third embodiment explained above, it is possible to exert the same effects as the effects in the first embodiment.

Fourth Embodiment

Figure 15:
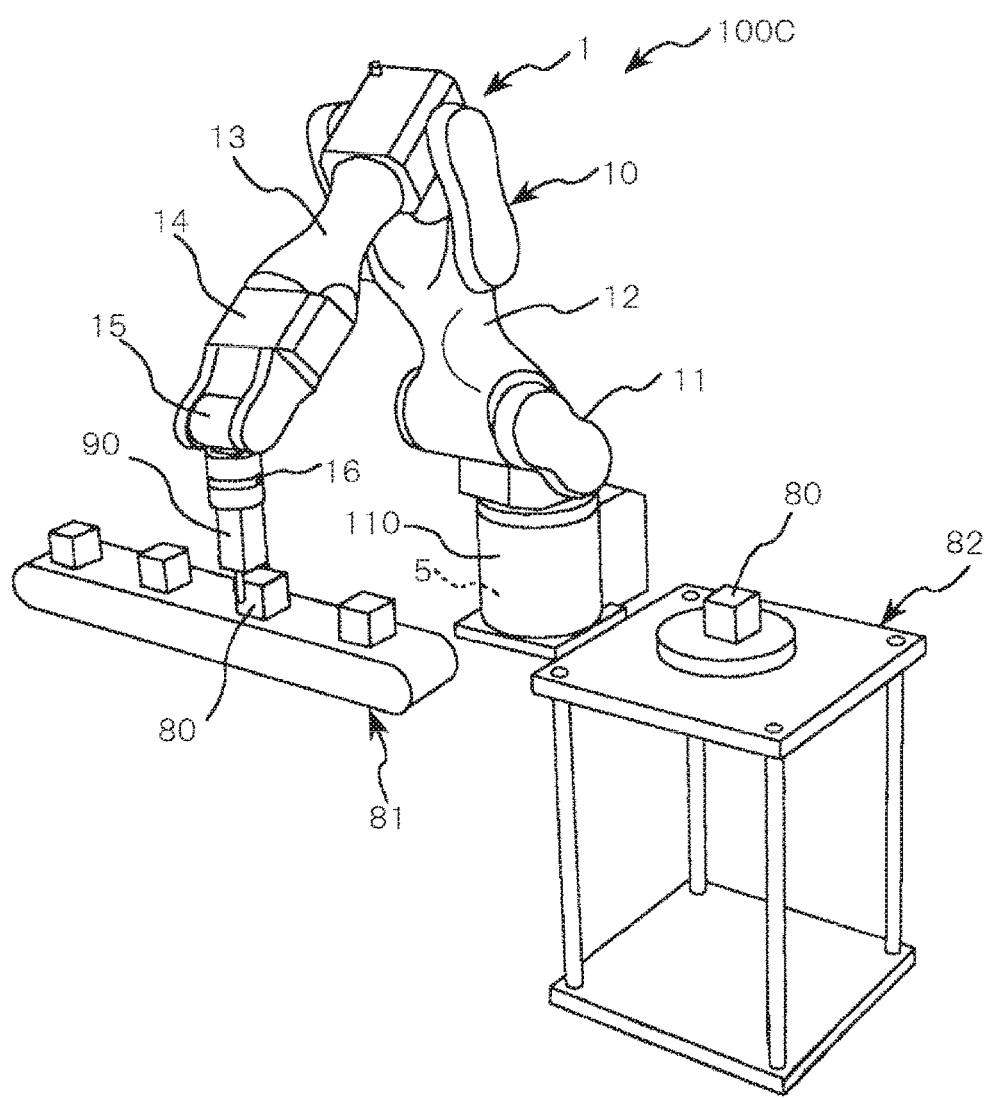
FIG. 15 is a diagram showing an example of work by a robot according to a fourth embodiment.
Figure 16:
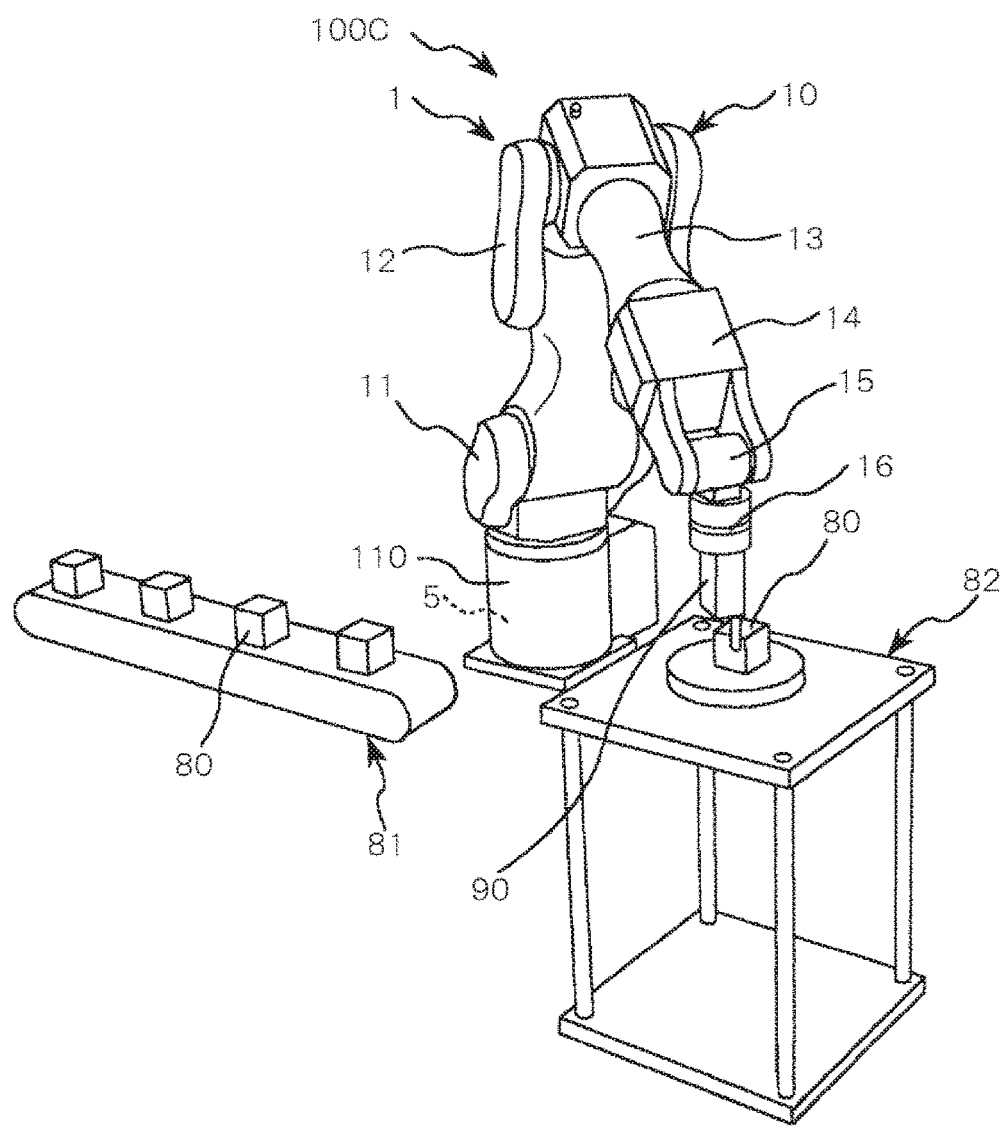
FIG. 16 is a diagram showing an example of work by the robot shown in FIG. 15.
Figure 17:
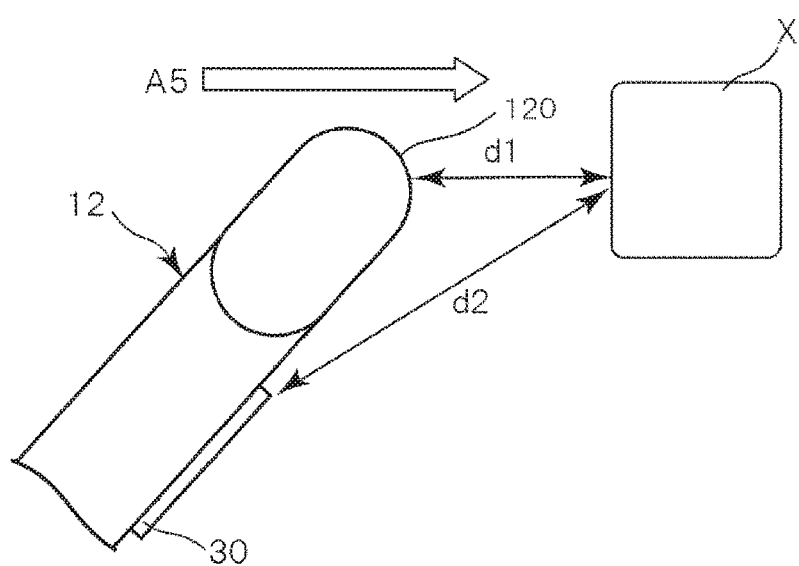
FIG. 17 is a diagram schematically showing an example of an operating direction of an arm.

FIG. 15 is a diagram showing an example of work by a robot according to a fourth embodiment. FIG. 16 is a diagram showing an example of work by the robot shown in FIG. 15. FIG. 17 is a diagram schematically showing an example of an operating direction of an arm.

The fourth embodiment is explained below. Differences from the embodiments explained above are mainly explained. Explanation of similarities to the embodiments is omitted.

This embodiment is different from the first embodiment in that thresholds of proximity detection of proximity sensors change.

When performing work, a robot 100C according to this embodiment performs various operations as time elapses (see FIGS. 15 and 16). For example, the robot 100C grasps, with the end effector 90, a work object 80 placed on a conveyor 81 as shown in FIG. 15. Thereafter, the robot 100C drives the robot arm 10 and places the work object 80 on a placing table 82 as shown in FIG. 16. In such work, operating speeds of the arms 11 to 16 in moving work from the conveyor 81 to the placing table 82 are high compared with grasping work in the conveyor 81 and placing work in the placing table 82. Therefore, the thresholds of the proximity detection of the proximity sensors 30 are sequentially changed to prevent the arms 11 to 16 from colliding with an object at any time.

In this way, in this embodiment, in the series of work (the grasping work, the moving work, and the placing work) by the robot 100C explained above, the thresholds of the proximity detection of the proximity sensors 30 are not fixed and are changed over time. That is, in the robot 100C according to this embodiment, the thresholds of the proximity detection change according to an operation state of the robot arm 10 (e.g., the changes in the operating speeds of the arms 11 to 16 explained above). Examples of the operation state of the robot 100C include, for example, besides the changes in the operating speeds of the arms 11 to 16 explained above, a change in a posture of the robot arm 10 during work and a change in a position relative to an object during work.

The thresholds change according to the operation state of the robot 100C in this way. Therefore, during the operation of the robot 100C, it is possible to reduce risk at collision time at any time.

In particular, as explained above, the thresholds of the proximity detection desirably change according to the changes in the operating speeds of the arms 11 to 16.

Consequently, it is possible to reduce risk at collision time while reducing deterioration in work efficiency of the robot 100C.

The setting of the thresholds of the proximity detection by the proximity sensors 30 can also be performed in teaching of the operation of the robot arm 10 included in the robot 100C. The setting in the teaching is particularly effective when it is desired to change the thresholds during the operation of the robot 100C.

For example, when the series of work by the robot 100C is taught, the setting of the thresholds of the proximity detection by the proximity sensors 30 can be performed. In this teaching, rotating speeds of the motors included in the driving sections 170 of the robot 100C, postures of the arms 11 to 16, and positions of the arms 11 to 16 are seen, operating speeds and operating directions of the arms 11 to 16 in the series of work by the robot 100C are seen. Therefore, it is possible to set the thresholds of the proximity detection by the proximity sensors 30 such that the thresholds of the proximity detection fluctuate according to the operating speeds and the operating directions of the arms 11 to 16 in the respective kinds of work.

In this way, it is desirable to set the thresholds of the proximity detection in the teaching of the operation of the robot arm 10.

Consequently, during the operation of the robot arm 10, it is possible to reduce a computational amount of the control device 5 compared with the method of sequentially changing the setting of the thresholds of the proximity detection by the proximity sensors 30. Therefore, it is possible to simply and inexpensively configure the control device 5.

In the setting of the thresholds, the thresholds of the proximity detection by the proximity sensors 30 are set according to shapes of the arms 11 to 16, setting positions of the proximity sensors 30, and operating directions of the arms 11 to 16. For example, as shown in FIG. 17, the threshold of the proximity detection by the proximity sensor 30 is set according to a shape of the arm 12, a setting position of the proximity sensor 30 provided in the arm 12, and an operating direction of the arm 12 on the basis of a portion that collides with an object such as a device X first. In FIG. 17, when a distance d2 between the proximity sensor 30 and the device X is longer than a distance d1 between a distal end portion 120 of the arm 12 and the device X and the arm 12 moves in an arrow A5 direction from the position of the arm 12 shown in FIG. 17, it is assumed that the distal end portion 120 of the arm 12 comes into contact with the device X earlier than the proximity sensor 30. Therefore, the threshold of the proximity detection by the proximity sensor 30 is set on the basis of the distal end portion 120 of the arm 12 that collides with the device X first.

In this way, the threshold of the proximity detection is set on the basis of at least one of (in this embodiment, all of) the shape of the arm 12, the setting position of the proximity sensor 30 provided in the arm 12, and the operating direction of the arm 12.

Consequently, it is possible to particularly effectively reduce risk of collision. In particular, to further reduce risk of collision, it is desirable to set the threshold on the basis of information concerning all of the shape of the arm 12, the setting position of the proximity sensor 30 provided in the arm 12, and the operating direction of the arm 12. Note that the same applies to the arms 11 and 13 to 16 other than the arm 12.

The preferred embodiments of the invention are explained above with reference to the drawings. However, the invention is not limited to the embodiments. The components of the sections can be replaced with any components having the same functions. Any other components may be added. The configurations of the two or more embodiments explained above may be combined.

In the embodiments explained above, the number of robot arms is one. However, the number of robot arms is not limited to this and may be two or more. That is, the robot according to the embodiments may be a plural arm robot such as a double arm robot.

In the embodiments explained above, the number of arms included in the robot arm is not limited to the number in the embodiments and may be, for example, three or more and five or less or seven or more.

The robot according to the embodiments is not limited to the so-called six-axis vertical articulated robot and may be other robots such as a SCARA robot.

The entire disclosure of Japanese Patent Application No. 2017-219719, filed Nov. 15, 2017 is expressly incorporated by reference herein.

What is claimed is:

1. A robot comprising:
    a robot body including a base, a first movable section provided turnably with respect to the base, and a second movable section provided turnably with respect to the first movable section;
    a first proximity sensor configured to detect contact of an object with or approach of the object to the first movable section; and
    a second proximity sensor configured to detect contact of the object with or approach of the object to the second movable section, wherein
    the first proximity sensor includes a first electrode section, capacitance of which changes according to the contact or the approach of the object, and a first circuit section configured to detect the capacitance of the first electrode section, the first electrode section including a first electrode arranged as a comb and a second electrode arranged as a comb, where teeth of the first electrode are separated from and mesh with teeth of the second electrode,
    the second proximity sensor includes a second electrode section, capacitance of which changes according to the contact or the approach of the object, and a second circuit section configured to detect the capacitance of the second electrode section, the second electrode section including a first electrode arranged as a comb and a second electrode arranged as a comb, where teeth of the first electrode are separated from and mesh with teeth of the second electrode,
    the first electrode section of the first proximity sensor is disposed covering outer surface sides of the first movable section, and
    the second electrode section of the second proximity sensor is disposed covering outer surface sides of the second movable section.

2. The robot according to claim 1,
    wherein a first detection time, which is a detection time by the first circuit section, and a second detection time, which is a detection time by the second circuit section, are temporally different.

3. The robot according to claim 1,
    wherein a first threshold, which is a threshold of approach determination by the first circuit section, and a second threshold, which is a threshold of approach determination by the second circuit section, are different.

4. A robot comprising:
a robot body section including a base and a movable section provided turnably with respect to the base;
a first proximity sensor configured to detect contact of an object with or approach of the object to the movable section; and
a second proximity sensor configured to detect contact of the object with or approach of the object to the movable section, wherein
the first proximity sensor includes a first electrode section, capacitance of which changes according to the contact or the approach of the object, and a first circuit section configured to detect the capacitance of the first electrode section, the first electrode section including a first electrode arranged as a comb and a second electrode arranged as a comb, where teeth of the first electrode are separated from and mesh with teeth of the second electrode,
the second proximity sensor includes a second electrode section, capacitance of which changes according to the contact or the approach of the object, and a second circuit section configured to detect the capacitance of the second electrode section, the second electrode section including a first electrode arranged as a comb and a second electrode arranged as a comb, where teeth of the first electrode are separated from and mesh with teeth of the second electrode,
the first electrode section of the first proximity sensor is disposed covering outer surface sides of the movable section, and
the second electrode section of the second proximity sensor is disposed covering outer surface sides of the movable section.

5. The robot according to claim 4,
wherein a first threshold, which is a threshold of approach determination by the first circuit section, and a second threshold, which is a threshold of approach determination by the second circuit section, are different.

6. A robot comprising:
a robot body including a base and a movable section provided turnably with respect to the base; and
a proximity sensor configured to detect contact of an object with or approach of the object to the movable section, wherein
the proximity sensor includes an electrode section, capacitance of which changes according to the contact or the approach of the object, and a circuit section configured to detect the capacitance of the electrode section, the first electrode section including a first electrode arranged as a comb and a second electrode arranged as a comb, where teeth of the first electrode are separated from and mesh with teeth of the second electrode,
a threshold, which is a threshold of approach determination by the circuit section, is changed according to operation of the robot, and
the electrode section of the proximity sensor is disposed covering outer surface sides of the movable section.

7. The robot according to claim 6,
wherein the threshold is changed at each operation step of the robot.

8. The robot according to claim 6,
wherein the threshold is changed according to operating speed of the robot.

9. The robot according to claim 6,
wherein the threshold is set according to a posture of the robot.

10. The robot according to claim 6,
wherein the threshold is set according to a distance to the object present around the robot.

11. The robot according to claim 6,
wherein the threshold is changed according to a distance to the object present around the robot.

12. The robot according to claim 6,
wherein the threshold is a setting item of teaching of the robot.

* * * * *